No. 680,507. Patented Aug. 13, 1901.
W. H. THOMAS.
TRELLIS OR HOLDING RACK FOR VEGETABLES.
(Application filed May 9, 1901.)
(No Model.)
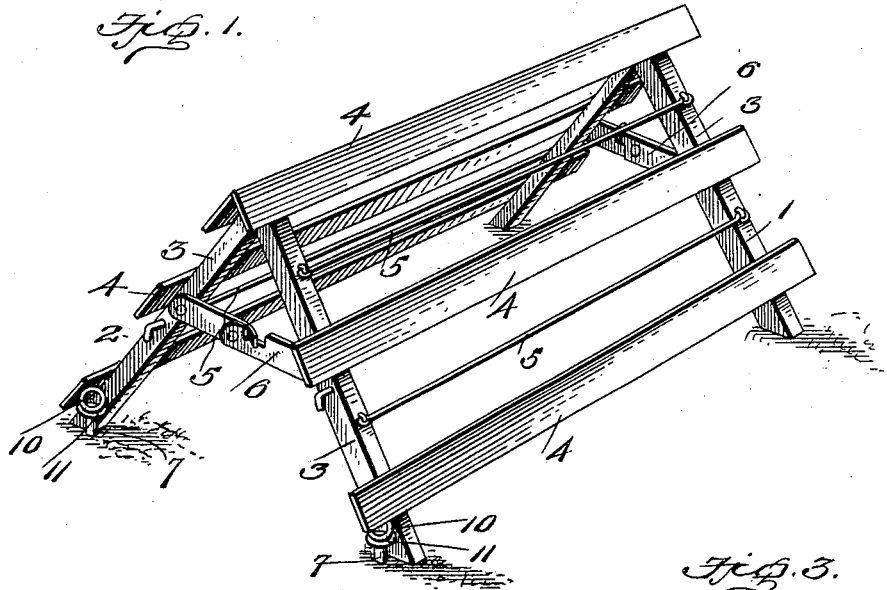
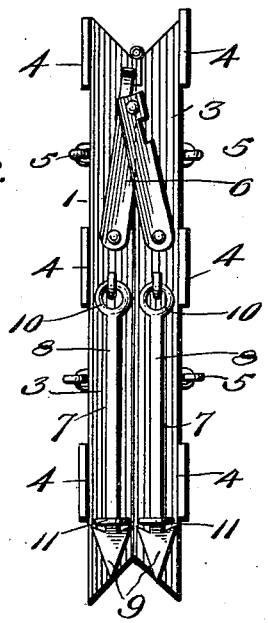
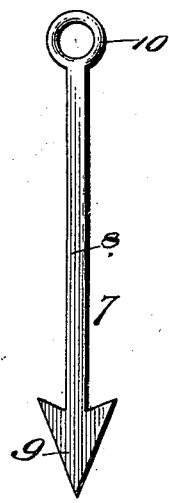

UNITED STATES PATENT OFFICE.

WILLIAM H. THOMAS, OF JENKINTOWN, PENNSYLVANIA.

TRELLIS OR HOLDING-RACK FOR VEGETABLES.

SPECIFICATION forming part of Letters Patent No. 680,507, dated August 13, 1901.

Application filed May 9, 1901. Serial No. 59,450. (No model.)

*To all whom it may concern:*

Be it known that I, WILLIAM H. THOMAS, a citizen of the United States, residing at Jenkintown, in the county of Montgomery and State of Pennsylvania, have invented certain new and useful Improvements in Trellises or Holding-Racks for Vegetables; and I do declare the following to be a full, clear, and exact description of the invention, such as will enable others skilled in the art to which it appertains to make and use the same.

The invention relates to a portable holding-rack or trellis for the cultivation of tomatoes, peas, and other vegetables or any kind of fruit which may need to be trained while growing.

The object of the invention is to provide a trellis of this character which shall be simple of construction, durable in use, and comparatively inexpensive of production and which when in use cannot be blown over by sudden gusts of wind and which when not in use may be folded into small compass to occupy but little room in storage and transportation.

With this and other objects in view the invention consists of certain novel features of construction, combination, and arrangement of parts, which will be hereinafter more fully described, and particularly pointed out in the appended claims.

In the accompanying drawings, Figure 1 is a perspective view of my improved trellis, showing it in position for use. Fig. 2 is an end view showing it in folded position, and Fig. 3 is a view in elevation of one of the anchor-stakes.

In the drawings, 1 and 2 denote side frames of the trellis, consisting of standards 3, connected together by cross-bars 4 and wires 5, and connected together by hinged braces 6, so as to be capable of being folded from the position shown in Fig. 1 to that shown in Fig. 2.

7 denotes the anchor-stakes, each of which consists of a bar or rod 8, having at one end an arrow-shaped head 9 and at its opposite end an apertured head 10. A stake is loosely connected to each standard of the trellis, preferably by a staple 11, through which the stake may freely work. The size of the staple is such as to prevent the stake from becoming disengaged from the standard, inasmuch as the apertured head will prevent the stake from being pulled downwardly through the staple, while the arrow-point will prevent it from being pulled upwardly through the staple. A turn-button, pin, hook, or other suitable means is secured to each standard above the staple and when in the position shown in Fig. 1 will permit the apertured head to freely engage therewith and when in the position shown in Fig. 2 will prevent the apertured head from being accidentally disengaged therefrom, for the distance between the apertured head and the upper end of the arrow-point is less than the distance between the free end of the hook or pin or other device and the staple when in the position shown in Fig. 2, while when in the position shown in Fig. 1 the distance is greater, so as to permit the apertured head to be freely slipped from said pin, turn-button, hook, or other device.

Any suitable angle may be given to the side pieces of the trellis to adapt the trellis to different kinds of vines or plants under cultivation, and when in position for use it will be impossible for the wind to blow it over, as the anchor-stakes provide secure fastening means and support the trellis in its proper position.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with a trellis provided with loops or staples, stakes slidably mounted in said loops or staples and provided at one end with an arrow-point and at the other end with an apertured head, and a fastening device for supporting the stake in elevated position when not in use, substantially as set forth.

2. A trellis consisting of hinged frames, in combination with staples secured at the lower ends of the trellis and a turn-hook secured above said staples, of anchor-stakes mounted to slide within the said staples and provided with an arrow-point at one end and an apertured head at the other end, the distance between said arrow-point and apertured head being less than the distance between the free ends of the hooks and the staples when in one position, and greater when the hook is turned in the opposite direction, said stakes being mounted to slide in said staples, substantially as set forth.

In testimony whereof I have hereunto set my hand in presence of two subscribing witnesses.

WILLIAM H. THOMAS.

Witnesses:
C. MATHER,
CHAS. MATHER, Jr.